United States Patent [19]
Itoh

[11] Patent Number: 5,844,725
[45] Date of Patent: *Dec. 1, 1998

[54] ZOOM LENS

[75] Inventor: Yoshinori Itoh, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 833,423

[22] Filed: Apr. 7, 1997

Related U.S. Application Data

[63] Continuation of Ser. No. 514,251, Aug. 11, 1995, abandoned.

[30] Foreign Application Priority Data

Sep. 6, 1994 [JP] Japan .................................. 6-239382

[51] Int. Cl.⁶ .................................................. G02B 15/14
[52] U.S. Cl. ............................................................ 359/692
[58] Field of Search ..................................... 359/692, 689, 359/708, 713

[56] References Cited

U.S. PATENT DOCUMENTS

| | | |
|---|---|---|
| 5,218,478 | 6/1993 | Itoh . |
| 5,274,504 | 12/1993 | Itoh . |
| 5,305,148 | 4/1994 | Ikemori et al. . |
| 5,315,440 | 5/1994 | Betensky et al. . |
| 5,365,376 | 11/1994 | Itoh . |
| 5,463,449 | 10/1995 | Ito et al. . |
| 5,493,448 | 2/1996 | Betensky et al. . |

FOREIGN PATENT DOCUMENTS

| | | |
|---|---|---|
| 57-201213 | 12/1982 | Japan . |
| 60-170816 | 9/1985 | Japan . |
| 60-191216 | 9/1985 | Japan . |
| 62-056917 | 3/1987 | Japan . |
| 62-090611 | 4/1987 | Japan . |
| 62-113120 | 5/1987 | Japan . |
| 62-284319 | 12/1987 | Japan . |
| 63-161422 | 7/1988 | Japan . |
| 63-256915 | 10/1988 | Japan . |
| 01-052111 | 2/1989 | Japan . |
| 01-193807 | 8/1989 | Japan . |
| 02-284109 | 11/1990 | Japan . |
| 03-116110 | 5/1991 | Japan . |
| 03-175409 | 7/1991 | Japan . |
| 04-022911 | 1/1992 | Japan . |
| 05-019166 | 1/1993 | Japan . |
| 6-160713 | 6/1994 | Japan . |

OTHER PUBLICATIONS

Shashin Kogyo (Photographic Industries), vol. 51 (Sep. 1993), p. 109.

*Primary Examiner*—Scott J. Sugarman
*Attorney, Agent, or Firm*—Fitzpatrick, Cella, Harper & Scinto

[57] ABSTRACT

A zoom lens comprising, from front to rear, a first lens unit of positive refractive power and a second lens unit of negative refractive power, zooming being performed by varying a separation between the first lens unit and the second lens unit, wherein the first lens unit has at least two positive lenses and at least two negative lenses, and wherein the distance for the telephoto end from the first lens surface to the last lens surface, the diagonal length of the effective area of an image frame, the shortest and longest focal lengths of the entire system are appropriately determined.

31 Claims, 15 Drawing Sheets

F I G. 1(A)
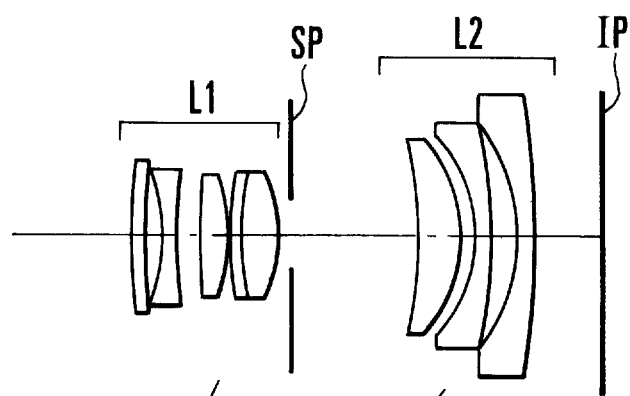
F I G. 1(B)
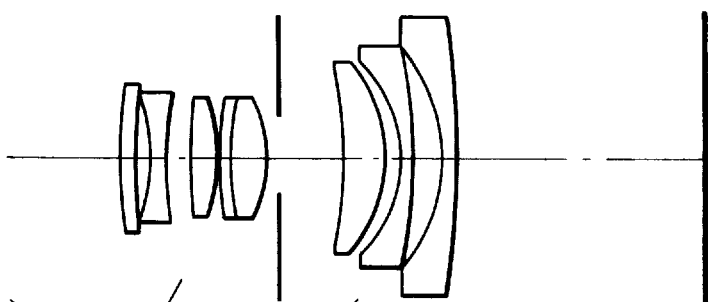
F I G. 1(C)
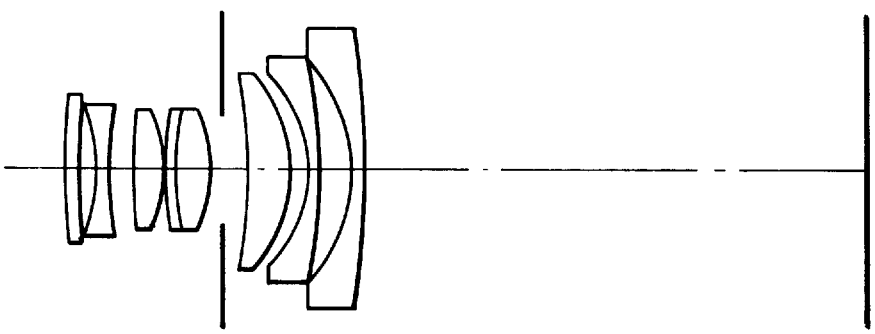

F I G. 2(A)
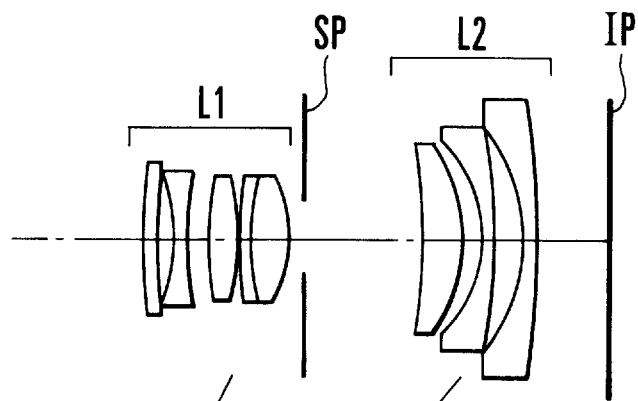
F I G. 2(B)
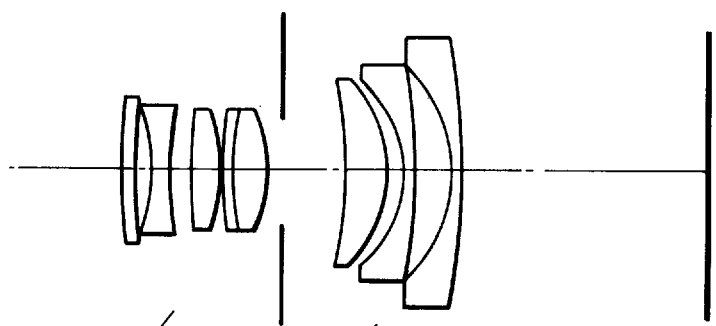
F I G. 2(C)
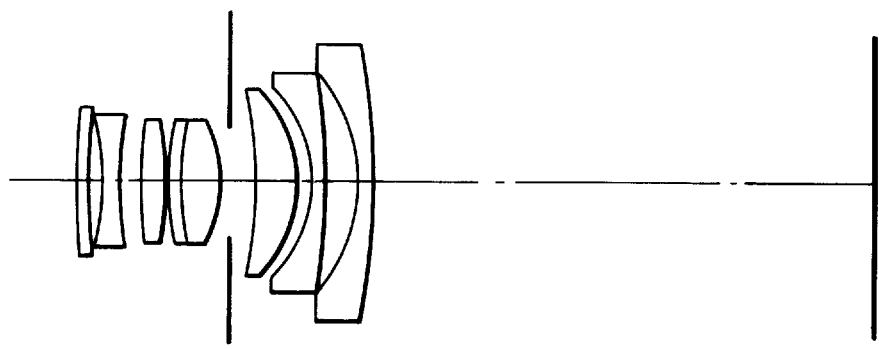

F I G. 4(A)
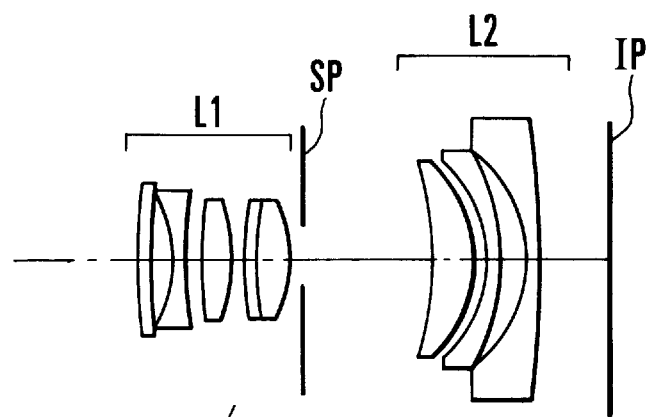
F I G. 4(B)
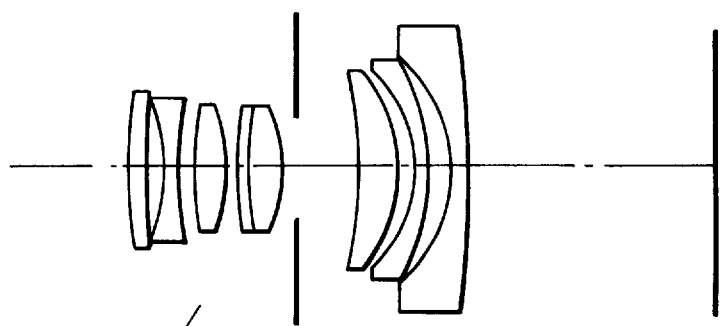
F I G. 4(C)
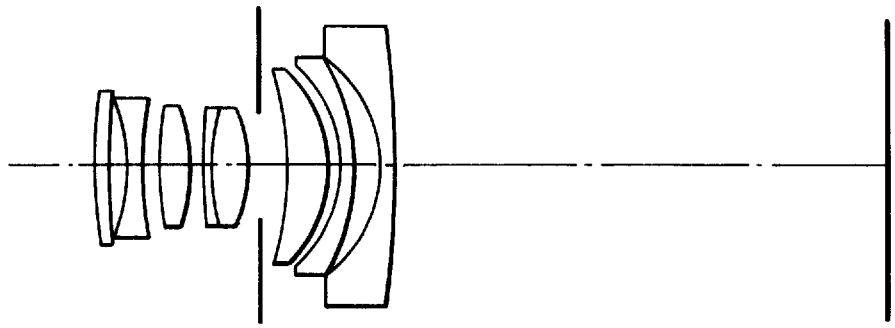

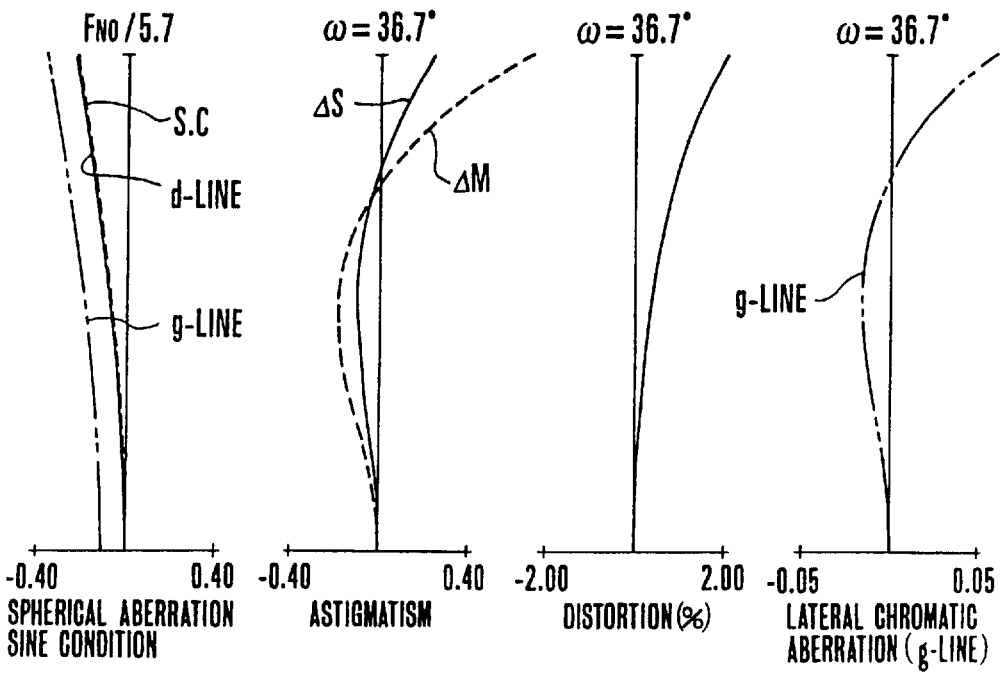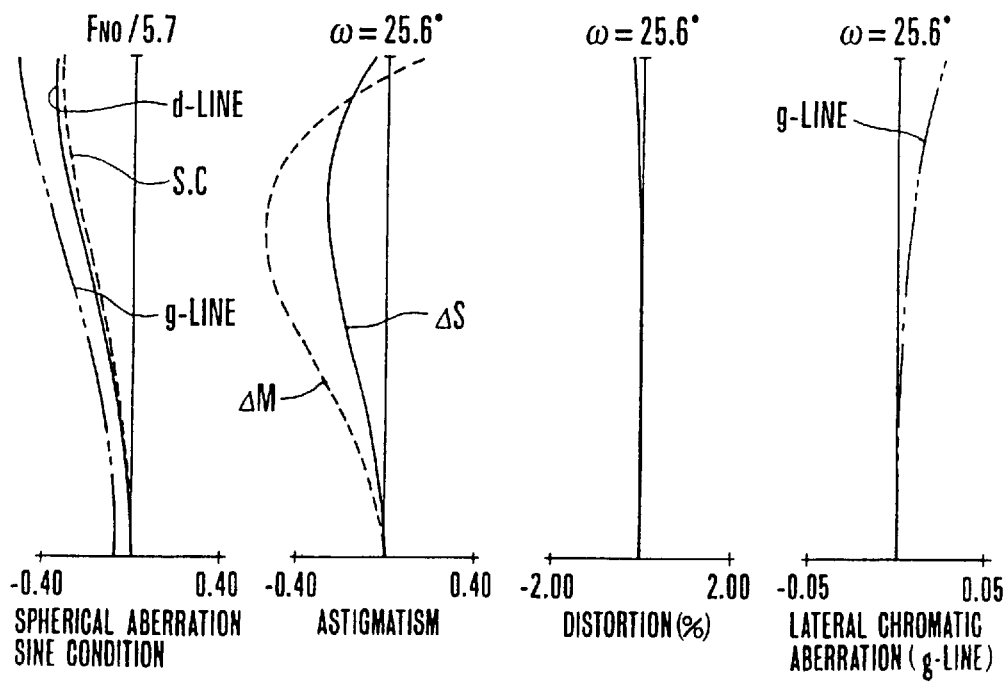

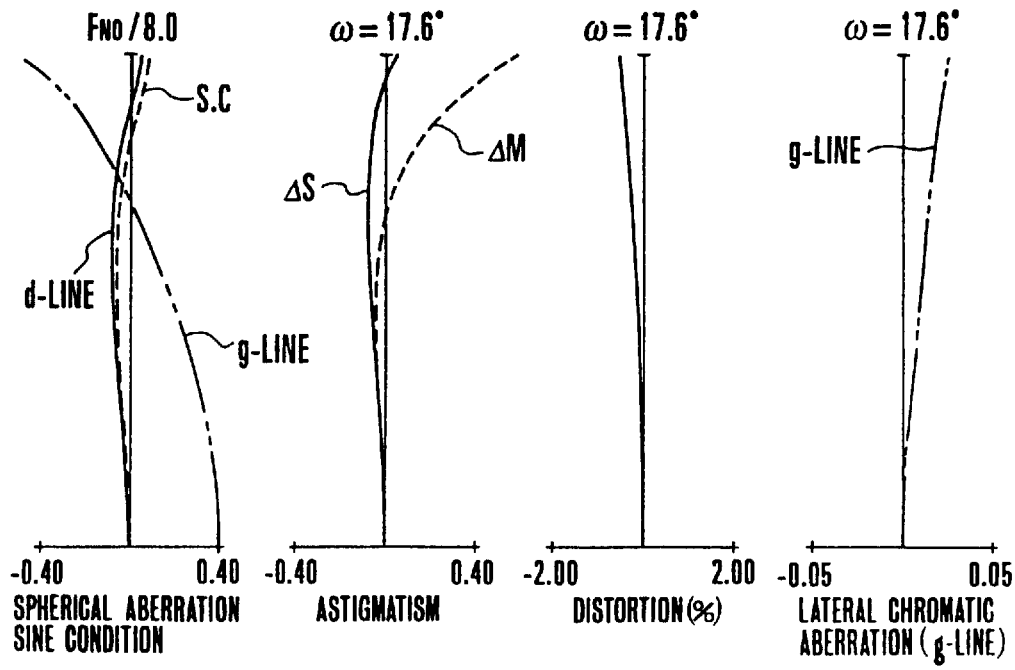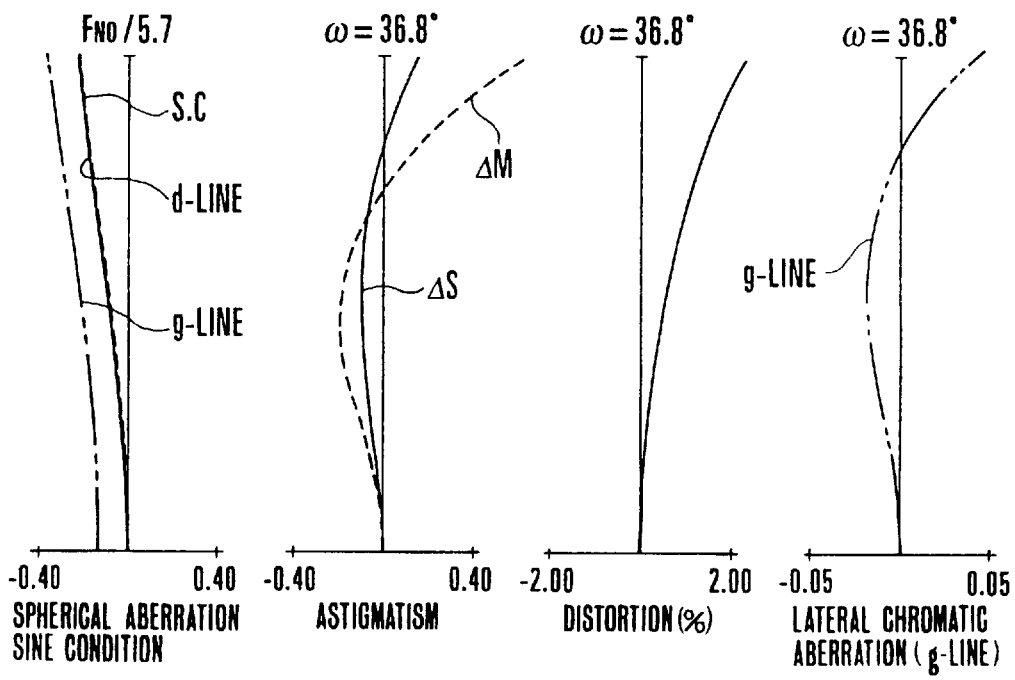

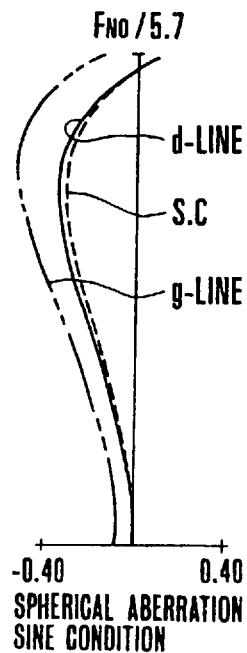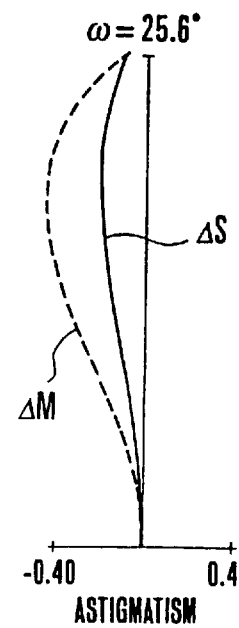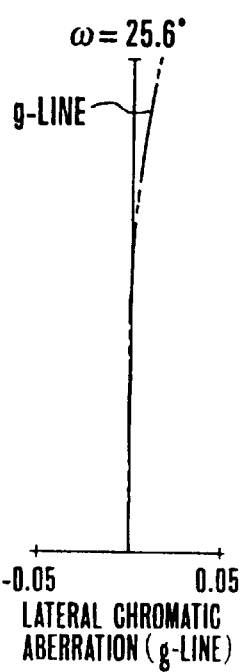
FIG. 11A  FIG. 11B  FIG. 11C  FIG. 11D
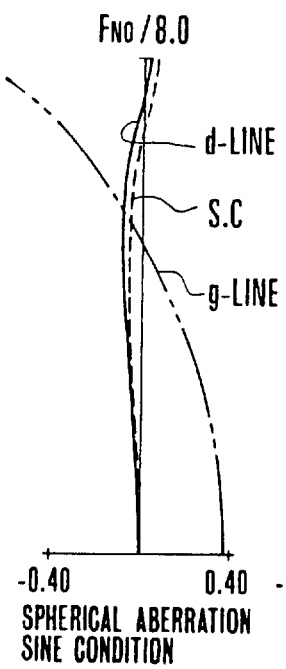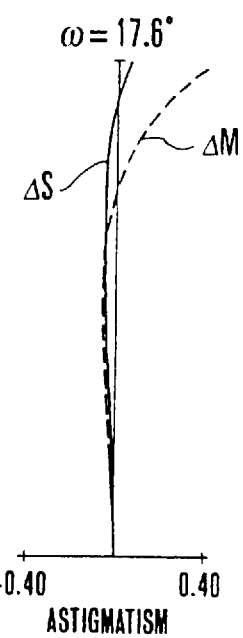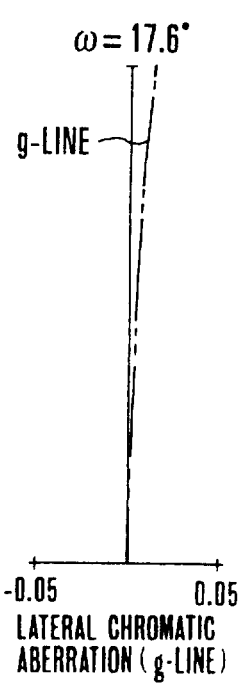
FIG. 12A  FIG. 12B  FIG. 12C  FIG. 12D

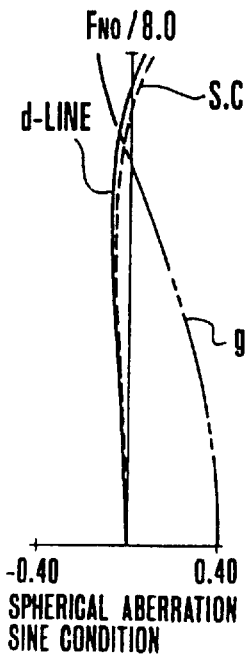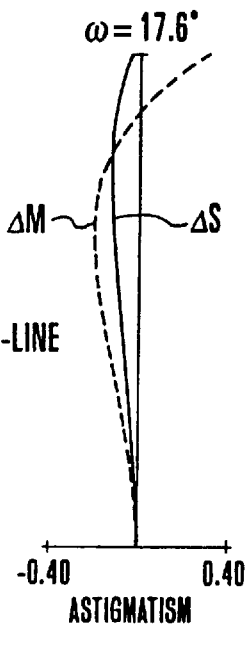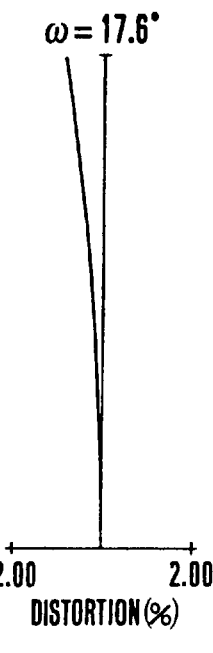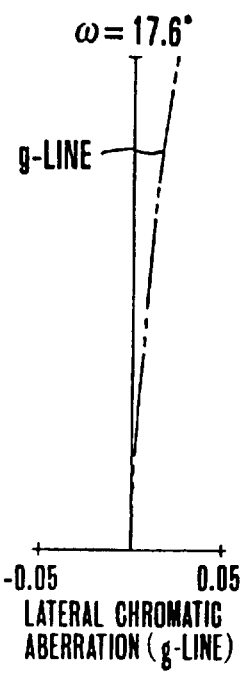
FIG. 15A  FIG. 15B  FIG. 15C  FIG. 15D
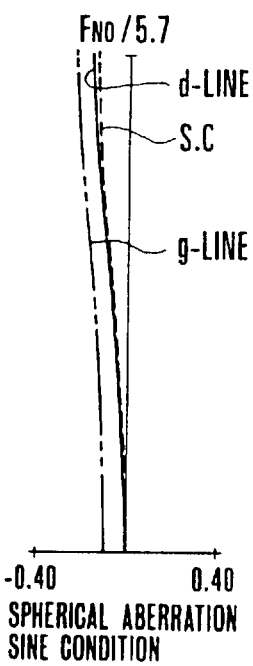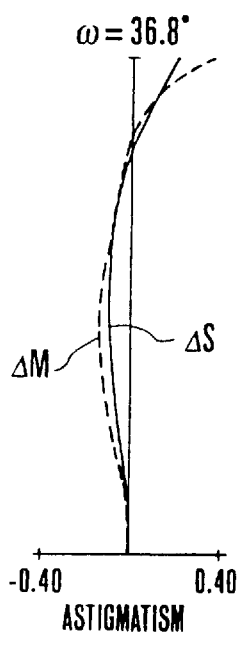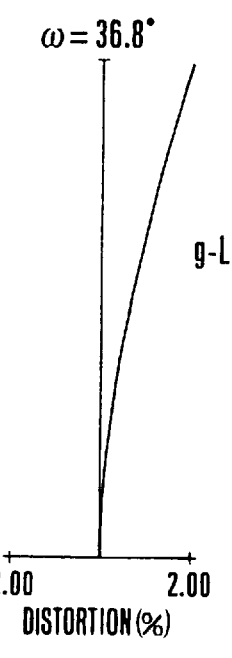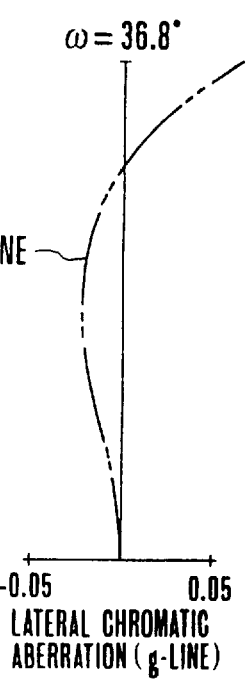
FIG. 16A  FIG. 16B  FIG. 16C  FIG. 16D

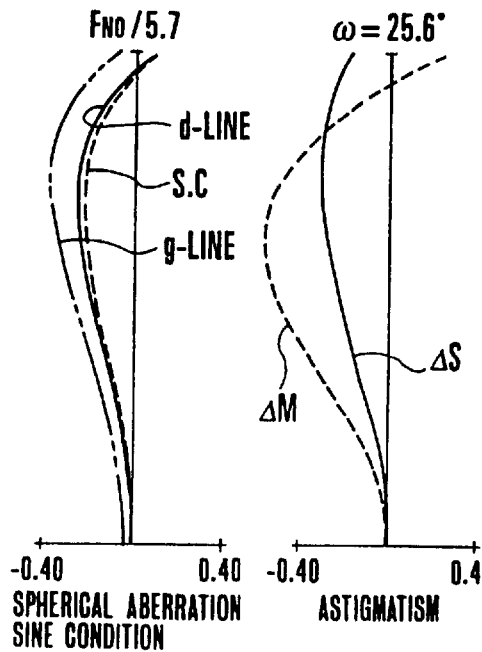 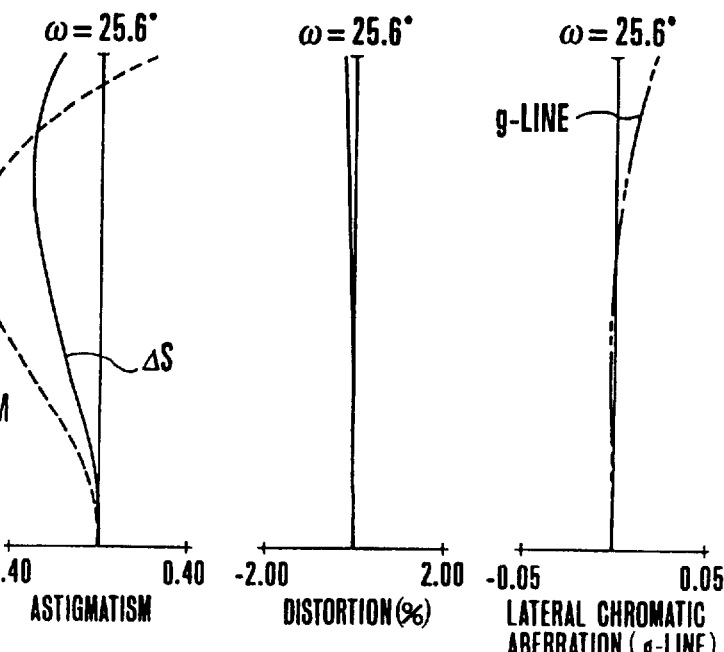 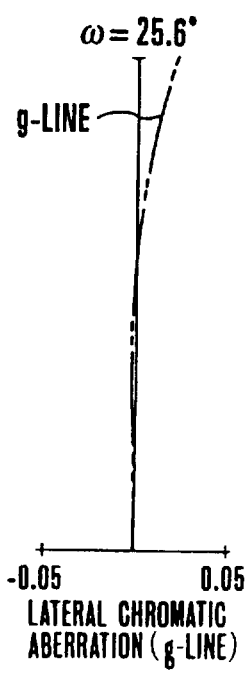
FIG. 17A   FIG. 17B   FIG. 17C   FIG. 17D
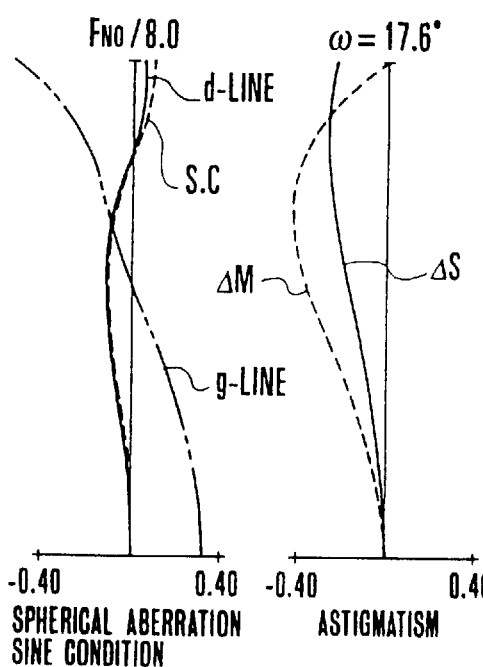 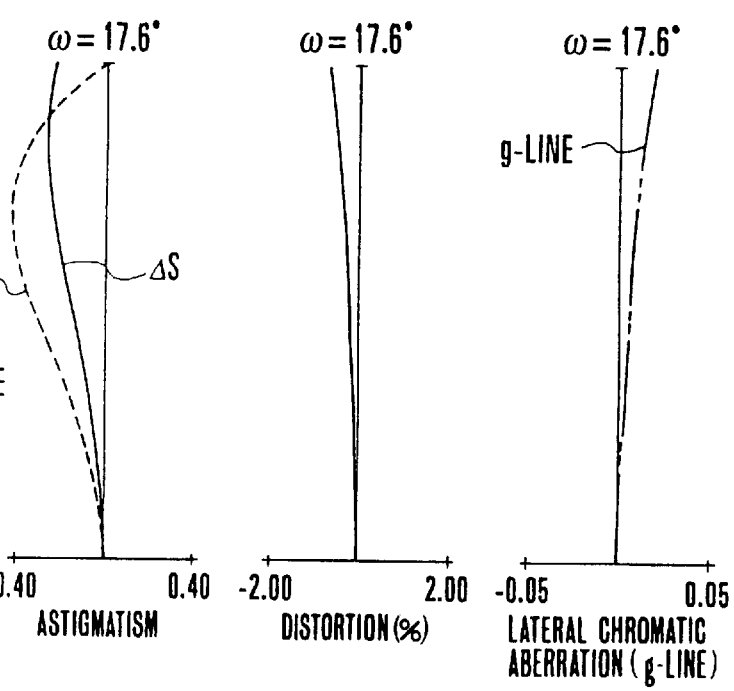 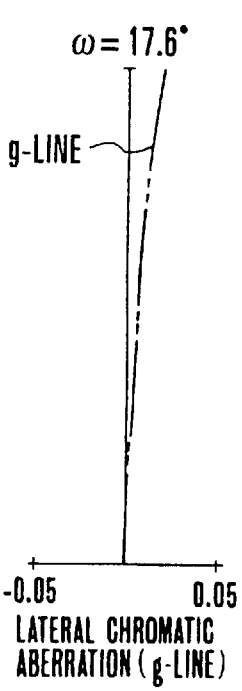
FIG. 18A   FIG. 18B   FIG. 18C   FIG. 18D

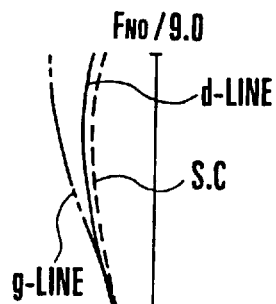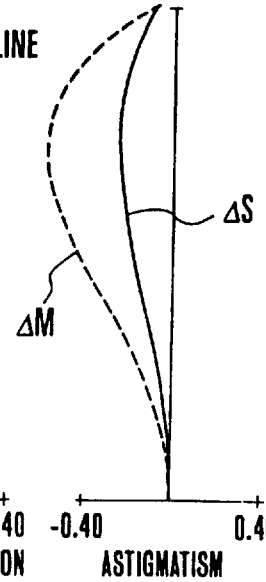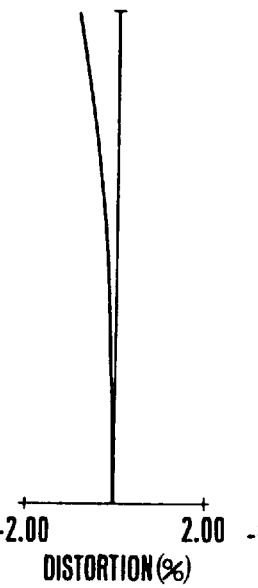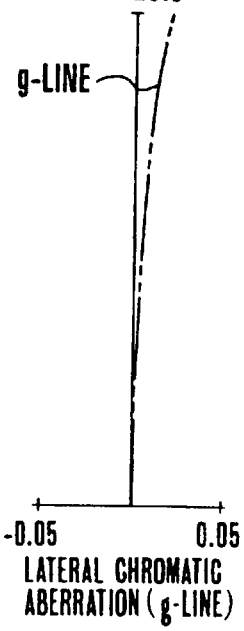
FIG. 23A   FIG. 23B   FIG. 23C   FIG. 23D
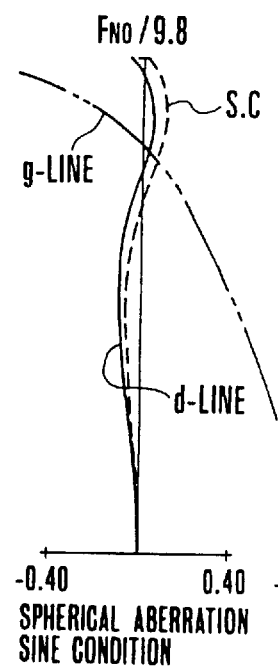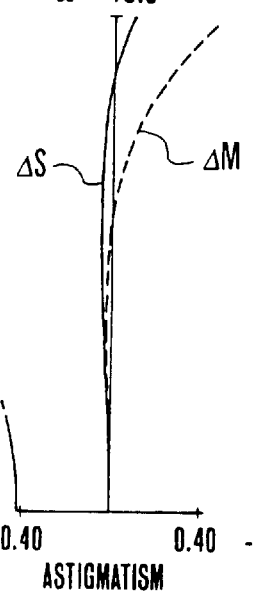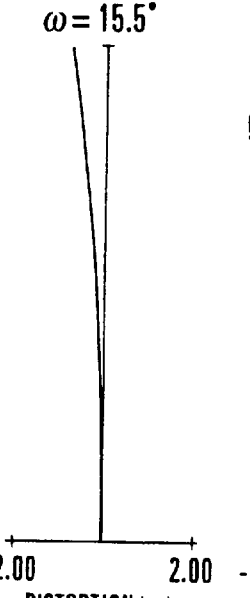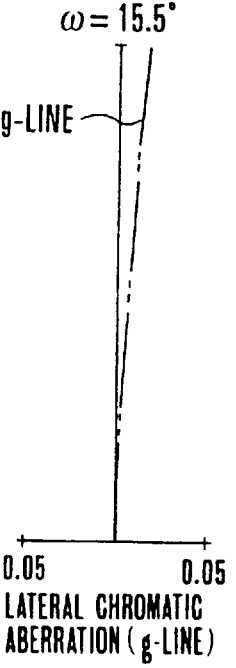
FIG. 24A   FIG. 24B   FIG. 24C   FIG. 24D

ZOOM LENS

This application is a continuation of application No. 08/514,251 filed Aug. 11, 1995, now abandoned.

BACKGROUND OF THE INVENTION

1. Field of the Invention

This invention relates to zoom lenses comprising two lens units suited for leaf shutter type cameras or video cameras and, more particularly, to zoom lenses whose angular field is wide and whose zoom ratio is 2.4 to 2.7 or thereabout and in which the lens units are appropriately formed to correct aberrations with the total length (the distance from the front vertex to the image plane) shortened.

2. Description of the Related Art

Recently, as the leaf shutter type cameras and video cameras decrease in size, the demand for zoom lenses of short total length is growing. Even in the field of art of compact cameras such as leaf shutter type cameras, which do not interchange the taking lenses, installation of zoom lenses is desired. In particular, such zoom lenses are required to have a physical length not much longer than that of the mono-focal length lenses which were heretofore used.

A compact zoom lens can be constructed, comprising, from front to rear, a first lens unit of positive refractive power and a second lens unit of negative refractive power, the separation between these two units being varied to effect zooming. This so-called 2-unit zoom lens has been proposed in Japanese Laid-Open Patent Applications Nos. Sho 57-201213, Sho 60-170816, Sho 60-191216 and Sho 62-56917.

In these documents, the plus-minus power arrangement as viewed from the object side is employed, and the back focal distance is made relatively short, while still maintaining a shortening of the total length of the entire system to be achieved. In addition, the 2-unit zoom lens has a high optical performance.

Besides these, there are Japanese Laid-Open Patent Applications Nos. Sho 62-284319, Sho 63-256915, Sho 64-52111 and Hei 1-193807, in which a 2-unit zoom lens is disclosed, comprising a first lens unit of positive refractive power and a second lens unit of negative refractive power, wherein both of these lens units are made to move axially forward as zooming from the wide-angle end to the telephoto end, while varying the separation therebetween.

Besides this, taking it as the 2-unit zoom lens, Japanese Laid-Open Patent Application No. Sho 63-161422 discloses a zoom lens in which the first lens unit is constructed with positive, negative, negative, positive and positive lenses, totaling five lenses, and which covers a field angle of about 55 degrees at the wide-angle end.

Japanese Laid-Open Patent Applications Nos. Sho 62-90611, Sho 62-113120 and Hei 3-116110 disclose that the first lens unit is constructed with positive, negative, negative and positive lenses, totaling four lenses. This 2-unit zoom lens has a zoom ratio of about 1.5.

Also, in Japanese Laid-Open Patent Application No. Hei 2-284109, a 2-unit zoom lens is disclosed wherein the first lens unit comprises positive, negative, negative, positive and positive lenses, totaling five lenses, and the second lens unit comprises positive, negative and negative lenses, totaling three lenses.

Also, in Japanese Laid-Open Patent Applications Nos. Hei 3-175409, Hei 4-22911 and Hei 5-19166, a 2-unit zoom lens is disclosed wherein the first lens unit comprises two or more positive lenses and three or more negative lenses.

With the use of the above-described type of 2-unit zoom lens having the first lens unit of positive refractive power and the second lens unit of negative refractive power, when to simultaneously fulfill the requirements of minimizing the size of the whole lens system, and of having a zoom ratio of 2.4 to 2.7 or thereabout and of obtaining good optical performance throughout the entire zooming range, there is a need to set forth proper rules of design for the construction and arrangement of the constituent lenses of each of the lens units.

In general, strengthening of the refractive powers of both of the first and second lens units decreases the zooming movement of each of the lens units, so that it becomes possible to shorten the total length of the entire lens system.

However, if the refractive power of each lens unit is strengthened without taking any other measures, the variation of aberrations with zooming gets larger. Thus, a problem arises in that this becomes difficult to correct well.

SUMMARY OF THE INVENTION

The present invention employs the so-called 2-unit type in designing a zoom lens and sets forth proper rules of design for the construction and arrangement of the constituent lenses of each of the lens units. Particularly for a zoom ratio of 2.4 to 2.7 or thereabout and a wide angular field coverage, a shortening of the total length is ensured. It is, therefore, an object of the invention to provide a zoom lens of improved compact form, while still maintaining high optical performance throughout the entire zooming range.

A zoom lens according to the invention comprises a first lens unit of positive refractive power and a second lens unit of negative refractive power arranged in this order from the object side. Zooming is performed by varying the separation between the first lens unit and the second lens unit. In such a zoom lens, the first lens unit has at least two positive lenses and at least two negative lenses. Also, letting the axial distance from the first lens surface to the last lens surface in the telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43 \qquad (1)$$

$$1.31 < LY/fW < 1.88 \qquad (2)$$

These and other characteristic features will become apparent from the following description taken in conjunction with the drawings.

BRIEF DESCRIPTION OF THE DRAWINGS

FIGS. 1(A), 1(B) and 1(C) are lens block diagrams of a numerical example 1 of the invention.

FIGS. 2(A), 2(B) and 2(C) are lens block diagrams of a numerical example 2 of the invention.

FIGS. 4(A), 4(B) and 4(C) are lens block diagrams of a numerical example 4 of the invention.

FIGS. 7A, 7B, 7C and 7D show aberration curves of the numerical example 1 of the invention in the wide-angle end.

FIGS. 8A, 8B, 8C and 8D show aberration curves of the numerical example 1 of the invention in a middle position.

FIGS. 9A, 9B, 9C and 9D show aberration curves of the numerical example 1 of the invention in the telephoto end.

FIGS. 10A, 10B, 10C and 10D show aberration curves of the numerical example 2 of the invention in the wide-angle end.

FIGS. 11A, 11B, 11C and 11D show aberration curves of the numerical example 2 of the invention in a middle position.

FIGS. 12A, 12B, 12C and 12D show aberration curves of the numerical example 2 of the invention in the telephoto end.

FIGS. 15A, 15B, 15C and 15D show aberration curves of the numerical example 3 of the invention in the telephoto end.

FIGS. 16A, 16B, 16C and 16D show aberration curves of the numerical example 4 of the invention in the wide-angle end.

FIGS. 17A, 16B, 16C and 16D show aberration curves of the numerical example 4 of the invention in a middle position.

FIGS. 18A, 18B, 18C and 18D show aberration curves of the numerical example 4 of the invention in the telephoto end.

FIGS. 23A, 23B, 23C and 23D show aberration curves of the numerical example 6 of the invention in a middle position.

FIGS. 24A, 24B, 24C and 24D show aberration curves of the numerical example 6 of the invention in the telephoto end.

In these graphs, d stands for the spectral d-line, g for the spectral g-line, S for the sagittal image focus and M for the meridional image focus.

DETAILED DESCRIPTION OF THE PREFERRED EMBODIMENTS

Figure 3A:
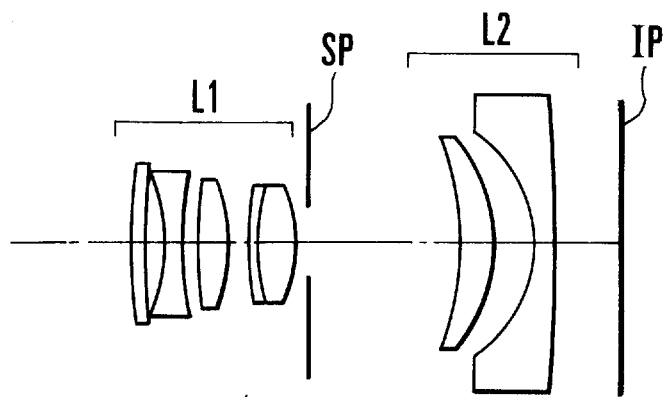
FIGS. 3(A), 3(B) and 3(C) are lens block diagrams of a numerical example 3 of the invention.
Figure 3B:
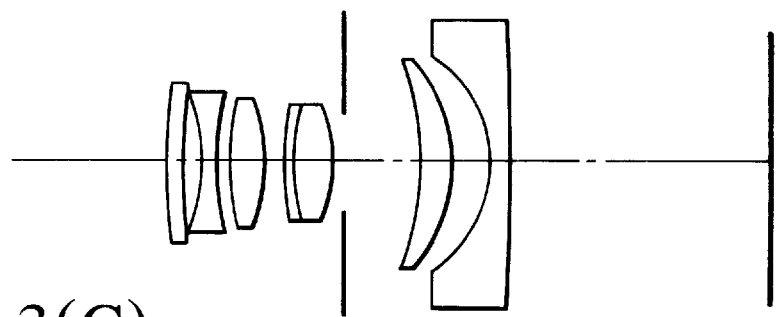
Figure 3C:
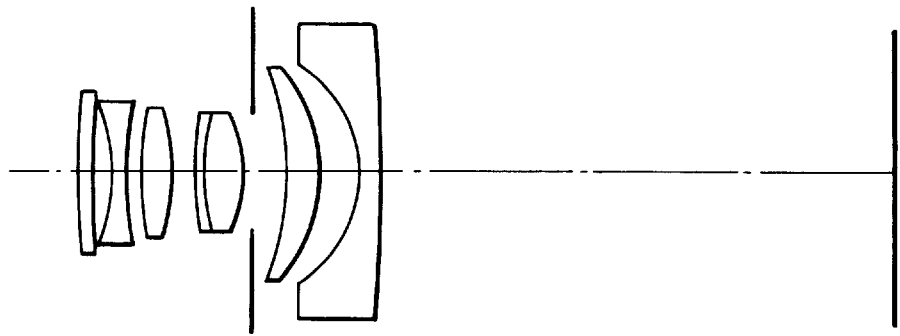
Figure 5A:
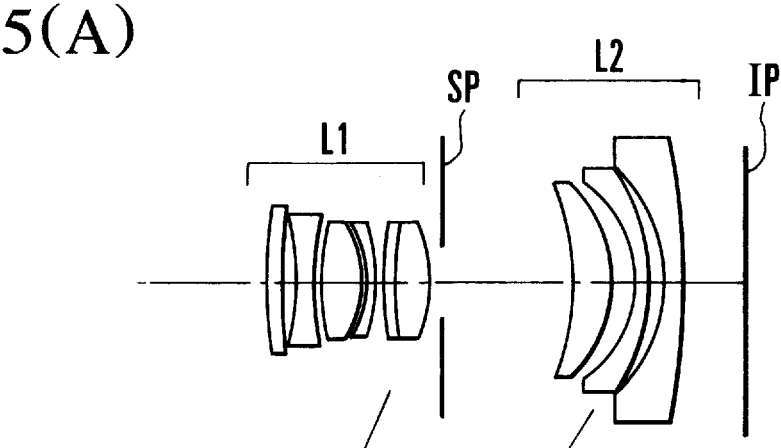
FIGS. 5(A), 5(B) and 5(C) are lens block diagrams of a numerical example 5 of the invention.
Figure 5B:
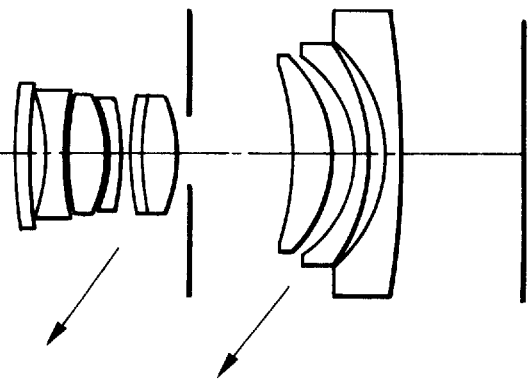
Figure 5C:
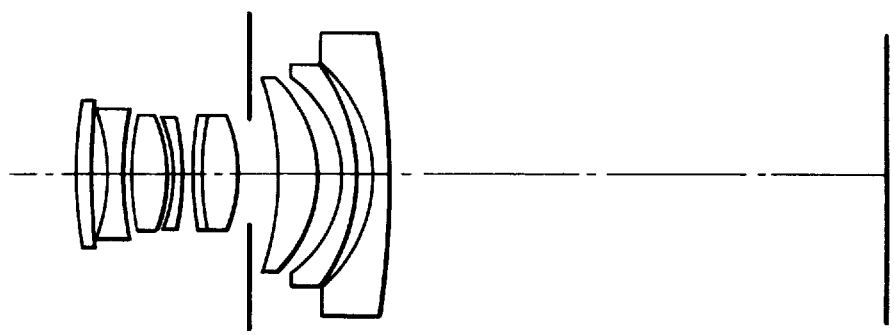
Figure 6A:
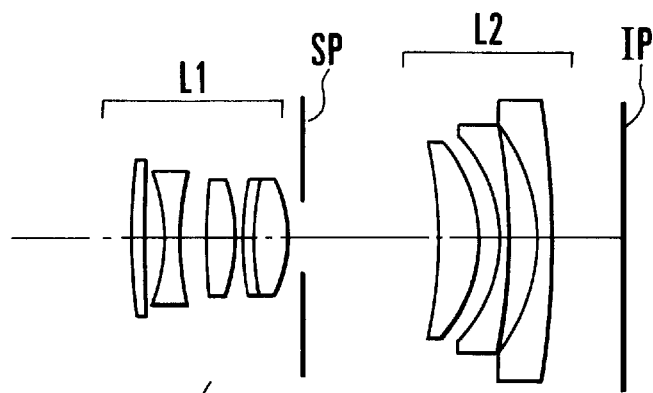
FIGS. 6(A), 6(B) and 6(C) are lens block diagrams of a numerical example 6 of the invention.
Figure 6B:
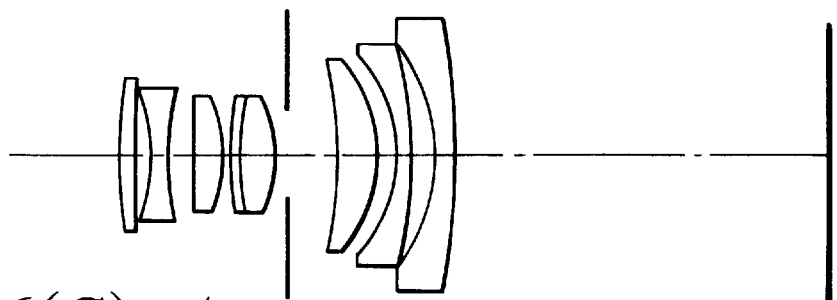
Figure 6C:
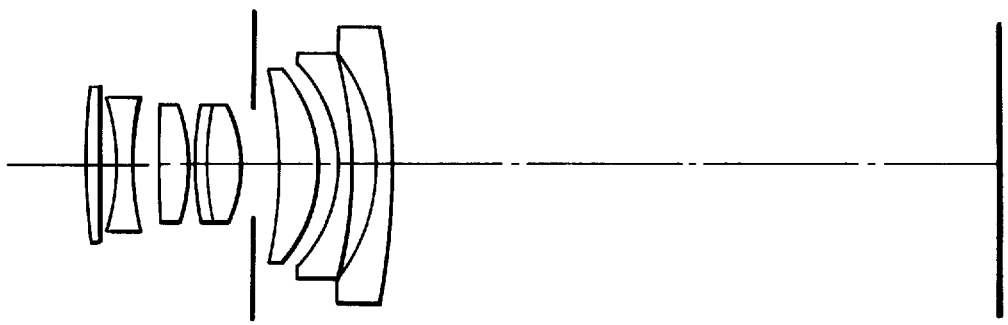
Figures 13A, 13B, 13C, 13D:
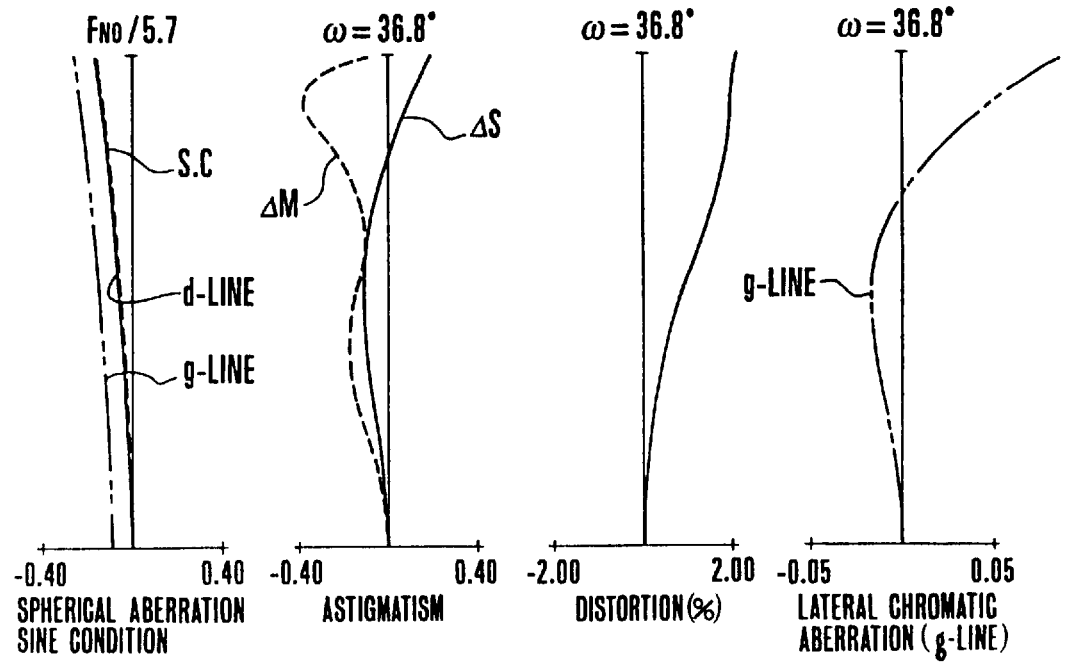
FIGS. 13A, 13B, 13C and 13D show aberration curves of the numerical example 3 of the invention in the wide-angle end.
Figures 14A, 14B, 14C, 14D:
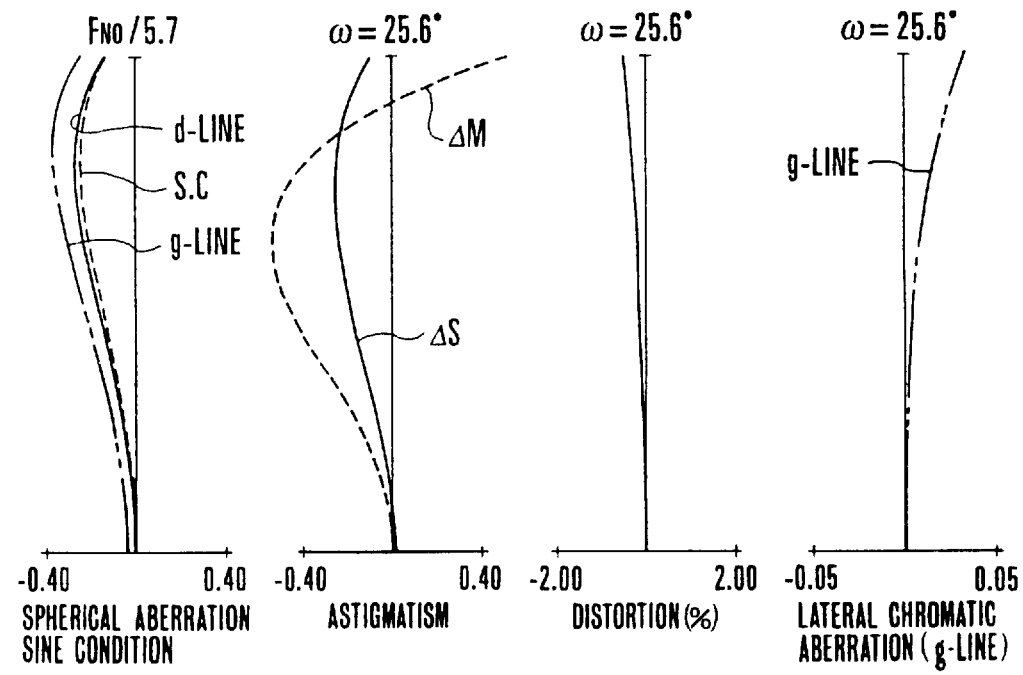
FIGS. 14A, 14B, 14C and 14D show aberration curves of the numerical example 3 of the invention in a middle position.
Figures 19A, 19B, 19C, 19D:
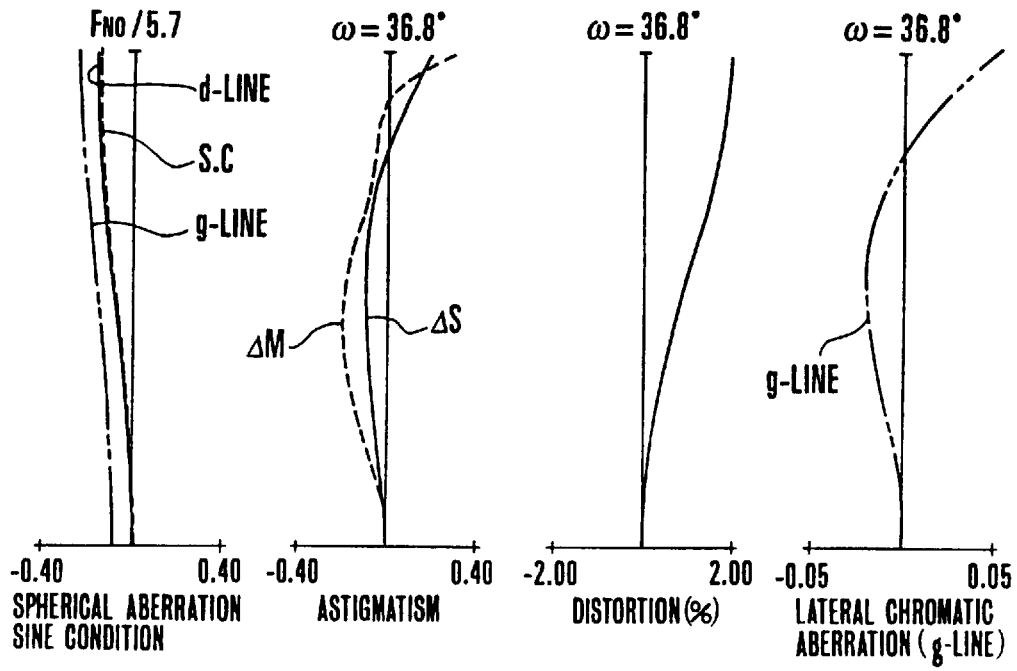
FIGS. 19A, 19B, 19C and 19D show aberration curves of the numerical example 5 of the invention in the wide-angle end.
Figures 20A, 20B, 20C, 20D:
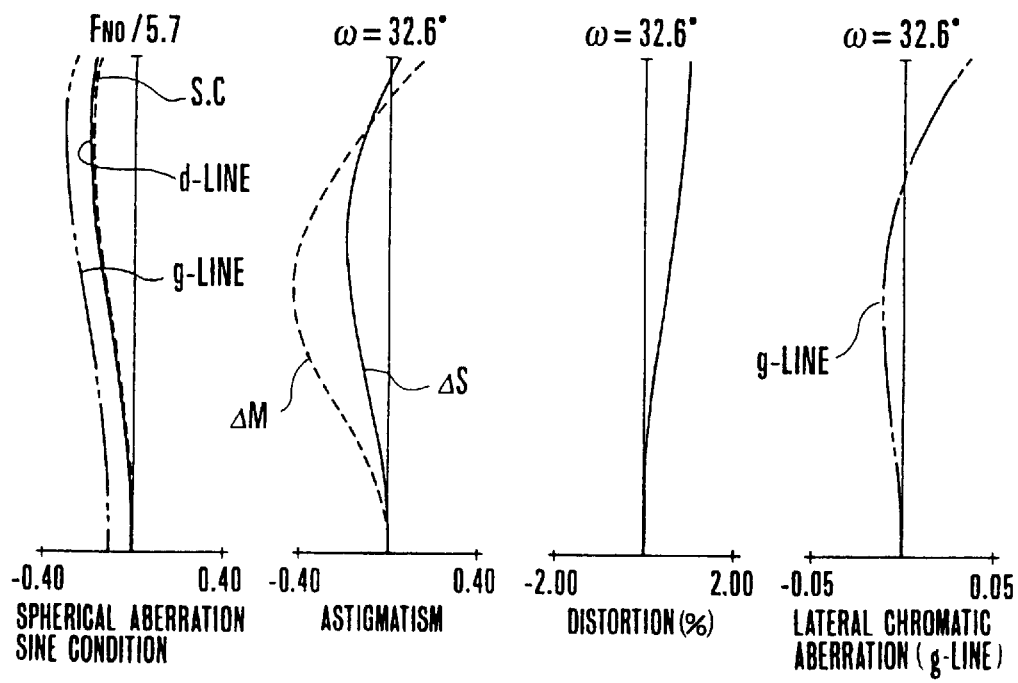
FIGS. 20A, 20B, 20C and 20D show aberration curves of the numerical example 5 of the invention in a middle position.
Figures 21A, 21B, 21C, 21D:
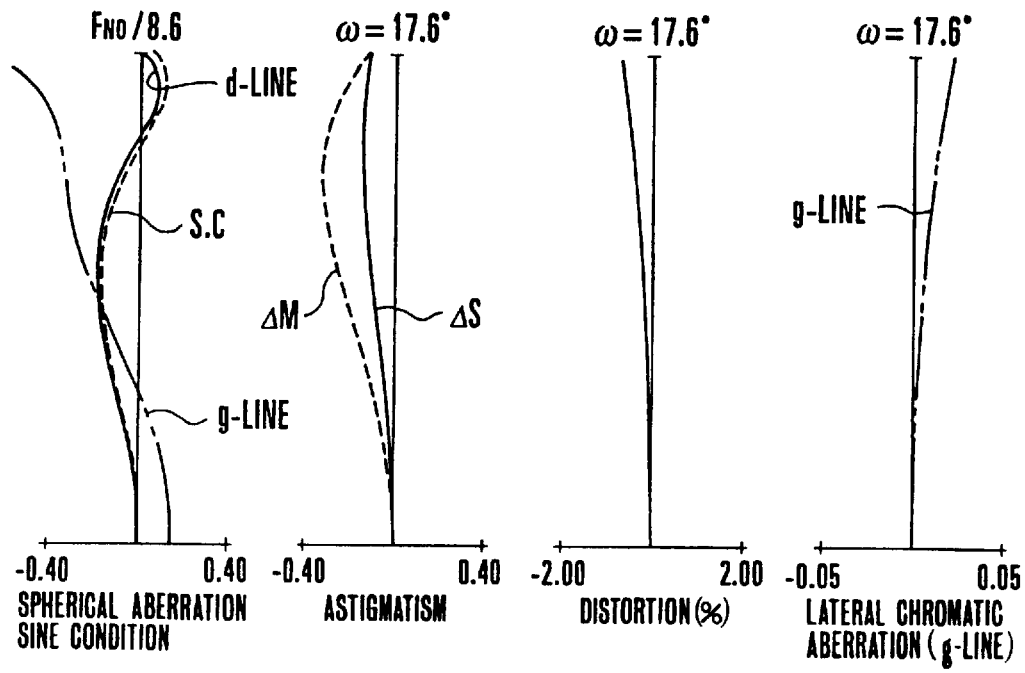
FIGS. 21A, 21B, 21C and 21D show aberration curves of the numerical example 5 of the invention in the telephoto end.
Figures 22A, 22B, 22C, 22D:
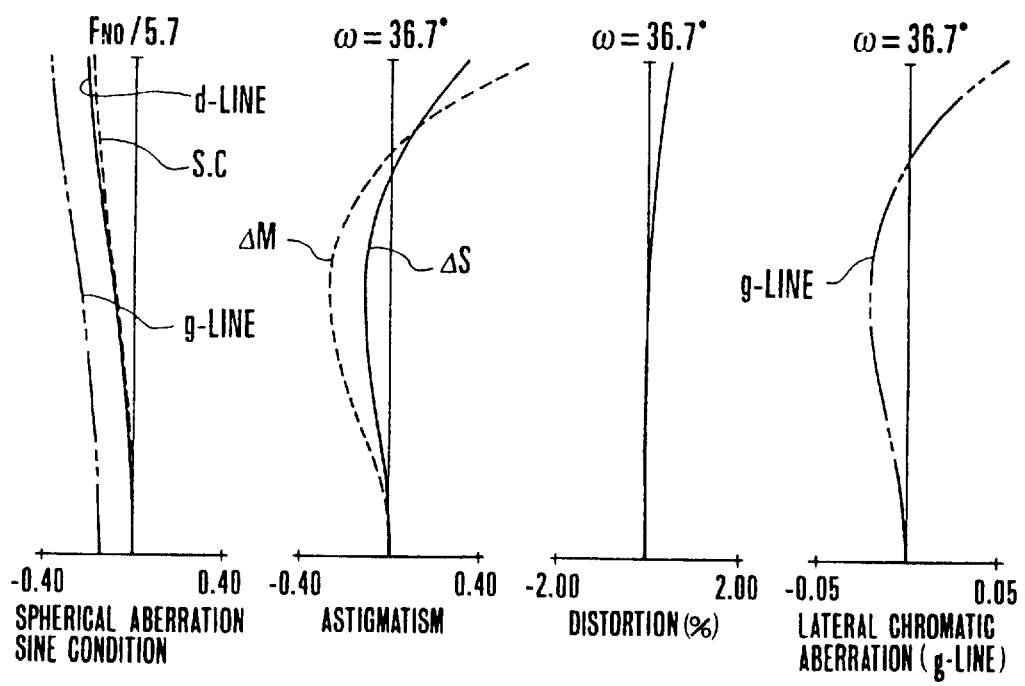
FIGS. 22A, 22B, 22C and 22D show aberration curves of the numerical example 6 of the invention in the wide-angle end.

FIGS. 1(A), 1(B) and 1(C) through FIGS. 6(A), 6(B) and 6(C) are longitudinal section views of numerical examples 1 to 6 of zoom lenses of the invention, respectively. Of these figures, the ones whose figure numbers are suffixed (A) are in the wide-angle end, the ones whose figure numbers are suffixed (B) are in a middle focal length position, and the ones whose figure numbers are suffixed (C) are in the telephoto end.

In the lens diagrams, reference character L1 denotes a first lens unit of positive refractive power and reference character L2 denotes a second lens unit of negative refractive power. The first lens unit and the second lens unit both are made to move axially forward, as indicated by the arrows, while simultaneously decreasing the separation between the first lens unit and the second lens unit, when zooming from the wide-angle end to the telephoto end. A stop SP is disposed on the image side of the first lens unit to move in unison with the first lens unit. IP stands for the image plane.

In the present embodiment, such a zoom type is employed, and the rules of design described above are adopted to assure shortening of the total length of the entire system. Particularly for the wide-angle end, the angular field coverage is widened and the total length is shortened. With these, the zoom ratio is taken at 2.4 to 2.7 or thereabout, and the variation of aberrations with zooming is corrected well. Thus, a high optical performance is obtained throughout the entire zooming range.

In addition, based on the conditions (1) and (2) described before, determination is made of the ratio of the physical length DLT for the telephoto end of the entire lens system (the distance of from the first lens surface to the last lens surface) to the longest focal length fT, and the ratio of the diagonal length LY of the effective area of the image frame to the shortest focal length fW. By this, the diameter of the front lens members is shortened in such a manner that off-axial aberrations such as coma are well corrected in the wide-angle end.

When the upper limit of the condition (1) is exceeded, as this means that the physical length of the entire lens system is too long in the telephoto end, the front lens diameter increases objectionably. When the physical length of the entire lens system in the telephoto end is too short as exceeding the lower limit, the coma and other off-axial aberrations as produced in the wide-angle end get larger. So, it becomes difficult to well correct these.

When the upper limit of the condition (2) is exceeded, as this means that the shortest focal length fW is too short compared with the diagonal length LY of the effective area of the image frame, or the angular field in the wide-angle end is too wide, it becomes difficult to maintain good optical performance over the entire area of the image frame when zooming to the wide-angle end. Moreover, the lens diameter increases objectionably. When the shortest focal length is too long as exceeding the lower limit, or the angular field in the wide-angle end is too narrow, the total length has to be increased objectionably. Otherwise, the zoom ratio could not be secured to a predetermined value.

To further improve the compact form of the entire system, while still permitting high optical performance to be obtained throughout the entire zooming range, the invention sets forth additional features or conditions as follows. It is preferred to satisfy at least one of these.

(1-1) For the first lens unit, the distance DL1 from its first lens surface to its last lens surface lies in the following range:

$$0.09 < DL1/fT < 0.27 \quad (3)$$

In a range above the upper limit of the condition (3), the front lens diameter increases in proportion to the physical length DL1 of the first lens unit. When the lower limit is exceeded, the physical length DL1 of the first lens unit is too short, the difficulty of adequately correcting off-axial aberrations in the wide-angle end increases objectionably.

(1-2) Of the negative lenses in the first lens unit, the frontmost negative lens has its lens surface on the image side formed in an aspheric shape such that the negative refractive power gets progressively stronger as going from the lens center to the margin and its lens surface on the object side formed to a radius of curvature RaF satisfying the following condition:

$$-0.37 < RaF/fT < -0.11 \qquad (4)$$

The inequalities of condition (4) have an aim chiefly to correct coma, flare and other aberrations in the wide-angle end, when an aspheric surface is formed on at least one lens surface of the frontmost one of the negative lenses in the first lens unit. When any of the upper limits and the lower limits of the condition (4) is exceeded, it becomes difficult to correct coma and flare in the wide-angle end.

(1-3) The first lens unit has a positive lens of meniscus form convex toward the object side, a negative lens of bi-concave form, a positive lens of bi-convex form having a strong positive refracting surface which faces the image side as compared with the object side, at least one negative lens, and a positive lens of bi-convex form having a strong refracting surface which faces the image side as compared with the object side.

The term "at least one negative lens" herein used refers to either a negative lens of meniscus form convex toward the object side, or a negative lens of meniscus form convex toward the image side and a negative lens of meniscus form convex toward the object side. By this, the variation of aberrations with zooming is corrected well. Throughout the entire zooming range and over the entire area of the image frame, a high optical performance is thus obtained.

(1-4) The second lens unit is constructed with a positive lens of meniscus form convex toward the image side and one or two negative lenses of meniscus form concave toward the object side.

It should be noted that, in the invention, instead of satisfying the features or conditions described above, the lens units may otherwise be designed as follows. Even in this case, it is possible to achieve a zoom lens the invention aims at.

(2-1) A zoom lens comprises, from front to rear, a first lens unit of positive refractive power and a second lens unit of negative refractive power, zooming being performed by varying the separation between the first lens unit and the second lens unit, wherein the first lens unit has at least two positive lenses and at least two negative lenses, and the frontmost one of negative lenses in the first lens unit has an aspheric surface of such shape that the negative refractive power gets progressively stronger as going from the lens center to the margin, and wherein letting the refractive index of the material of the frontmost negative lens be denoted by NaL, the following condition is satisfied:

$$1.65 < NaL \qquad (5)$$

By this, the requirements of improving the compact form of the lens system as a whole and of obtaining high optical performance throughout the entire zooming range are fulfilled at once. Here, the condition (5) is concerned with the frontmost one of the negative lenses in the first lens unit which has at least one of its lens surfaces made aspherical, and gives a proper range for the refractive index of the material of that negative lens in order to correct aberrations, mainly field curvature. When the condition (5) is violated, the Petzval sum increases in the negative direction. So, the curvature of field increases largely. Within the framework of these features, for further improvements of the aberration correction, it is preferred to satisfy the following features or conditions:

(2-2) Of the negative lenses in the first lens unit, the frontmost one is made from the material whose Abbe number vaL lies within the following range:

$$49 < vaL \qquad (6)$$

The inequality of condition (6) gives a proper range for the Abbe number of the material of that negative lens on which an aspheric sphere has been formed and has an aim chiefly to correct lateral chromatic aberration throughout the entire zooming range. When the condition (6) is violated, it becomes difficult to correct the variation of lateral chromatic aberration with zooming.

(2-3) The aspheric surface of the frontmost one of the negative lenses in the first lens unit is a lens surface on the image side, and a lens surface on the object side of the frontmost negative lens has its radius of curvature RaF made to satisfy the following condition:

$$-0.37 < RaF/fT < -0.11 \qquad (7)$$

where fT is the longest focal length of the entire system.

The inequalities of condition (7) have an aim chiefly to correct coma, flare and other aberrations in the wide-angle end, when an aspheric surface is formed on at least one lens surface of the frontmost one of the negative lenses in the first lens unit. When any of the upper limits and the lower limits of the condition (7) is exceeded, it becomes difficult to correct coma and flare in the wide-angle end.

(2-4) The first lens unit has a positive lens of meniscus form convex toward the object side, a negative lens of bi-concave form, a positive lens of bi-convex form having a strong positive refracting surface which faces the image side as compared with the object side, at least one negative lens, and a positive lens of bi-convex form having a strong refracting surface which faces the image side as compared with the object side.

The term "at least one negative lens" herein used refers to either a negative lens of meniscus form convex toward the object side, or a negative lens of meniscus form convex toward the image side and a negative lens of meniscus form convex toward the object side. By this, the variation of aberrations with zooming is corrected well. Throughout the entire zooming range and over the entire area of the image frame, a high optical performance is thus obtained.

(2-5) The second lens unit is constructed with a positive lens of meniscus form convex toward the image side and one or two negative lenses of meniscus form concave toward the object side.

Next, numerical examples 1 to 6 of the invention are shown. In the numerical data for the examples 1 to 6, Ri is the radius of curvature of the i-th lens surface, when counted from the object side, Di is the i-th lens thickness or air separation, when counted from the object side, and Ni and vi are respectively the refractive index and Abbe number of the material of the i-th lens element, when counted from the object side. The values of the factors in the above-described conditions (1) to (6) for the numerical examples 1 to 6 are listed in Table-1.

The shape of an aspheric surface is expressed in the coordinates with an X axis in the axial direction and an H axis in the perpendicular direction to an optical axis, the direction in which light advances being taken as positive, by the following equation:

$$X = \frac{(1/R)H^2}{1+\sqrt{1-(H/R)^2}} + AH^2 + BH^4 + CH^6 + DH^8 + EH^{10}$$

where R is the radius of the osculating sphere, and K, B, C, D and E are the aspheric coefficients. Also notice that the notation: D-0X means $10^{-X}$.

Numerical Example 1:

| | | | |
|---|---|---|---|
| f = 28.97–68.00 | Fno = 1:5.7–8.0 | 2ω = 73.5°–35.3° | |
| R1 = 57.49 | D1 = 1.50 | N1 = 1.62004 | ν1 = 36.3 |
| R2 = 204.61 | D2 = 1.41 | | |
| R3 = −15.75 | D3 = 1.28 | N2 = 1.66910 | ν2 = 55.4 |
| R4 = 55.37 | D4 = 2.06 | | |
| R5 = 54.69 | D5 = 2.65 | N3 = 1.48749 | ν3 = 70.2 |
| R6 = −18.73 | D6 = 0.19 | | |
| R7 = 42.69 | D7 = 0.89 | N4 = 1.84666 | ν4 = 23.8 |
| R8 = 24.85 | D8 = 3.52 | N5 = 1.48749 | ν5 = 70.2 |
| R9 = −12.32 | D9 = 0 70 | | |
| R10 = (Stop) | D10 = Variable | | |
| R11 = −53.46 | D11 = 3.88 | N6 = 1.58144 | ν6 = 40.8 |
| R12 = −13.66 | D12 = 1.55 | | |
| R13 = −12.67 | D13 = 1.20 | N7 = 1.71300 | ν7 = 53.8 |
| R14 = −48.46 | D14 = 2.85 | | |
| R15 = −15.53 | D15 = 1.30 | N8 = 1.71300 | ν8 = 53.8 |
| R16 = −90.34 | | | |

| Variable | Focal Length | | |
|---|---|---|---|
| Separation | 28.98 | 45.18 | 67.99 |
| D10 | 11.62 | 5.76 | 2.24 |

R4: Aspheric Surface

B = 1.582 D-04    C = 1.291 D-06    D = 6.793 D-09

Numerical Example 2:

| | | | |
|---|---|---|---|
| f = 28.94–68.14 | Fno = 1:5.7–8.0 | 2ω = 73.4°–35.3° | |
| R1 = 72.55 | D1 = 1.50 | N1 = 1.67270 | ν1 = 32.1 |
| R2 = 198.34 | D2 = 1.34 | | |
| R3 = −16.84 | D3 = 1.28 | N2 = 1.66910 | ν2 = 55.4 |
| R4 = 54.83 | D4 = 2.00 | | |
| R5 = 47.16 | D5 = 2.61 | N3 = 1.48749 | ν3 = 70.2 |
| R6 = −21.31 | D6 = 0.19 | | |
| R7 = 45.95 | D7 = 0.89 | N4 = 1.80518 | ν4 = 25.4 |
| R8 = 21.81 | D8 = 3.69 | N5 = 1.51633 | ν5 = 64.2 |
| R9 = −12.02 | D9 = 0.70 | | |
| R10 = (Stop) | D10 = Variable | | |
| R11 = −54.77 | D11 = 3.90 | N6 = 1.58144 | ν6 = 40.8 |
| R12 = −13.08 | D12 = 1.49 | | |
| R13 = −12.05 | D13 = 1.20 | N7 = 1.71300 | ν7 = 53.8 |
| R14 = −55.46 | D14 = 2.93 | | |
| R15 = −15.21 | D15 = 1.30 | N8 = 1.71300 | ν8 = 53.8 |
| R16 = −71.79 | | | |

| Variable | Focal Length | | |
|---|---|---|---|
| Separation | 28.95 | 45.08 | 68.14 |
| D10 | 11.12 | 5.58 | 2.21 |

R4: Aspheric Surface

B = 1.776 D-04    C = 1.568 D-06    D = 1.280 D-08

Numerical Example 3:

| | | | |
|---|---|---|---|
| f = 28.95–68.00 | Fno = 1:5.7–8.0 | 2ω = 73.5°–35.3° | |
| R1 = 77.50 | D1 = 1.50 | N1 = 1.69895 | ν1 = 30.1 |
| R2 = 200.26 | D2 = 1.63 | | |
| R3 = −16.77 | D3 = 1.30 | N2 = 1.66910 | ν2 = 55.4 |
| R4 = 39.61 | D4 = 1.21 | | |
| R5 = 34.15 | D5 = 3.11 | N3 = 1.51633 | ν3 = 64.2 |
| R6 = −19.40 | D6 = 1.80 | | |
| R7 = 41.23 | D7 = 0.90 | N4 = 1.80518 | ν4 = 25.4 |
| R8 = 20.19 | D8 = 3.61 | N5 = 1.51633 | ν5 = 64.2 |
| R9 = −14.00 | D9 = 0.70 | | |
| R10 = (Stop) | D10 = Variable | | |
| R11 = −27.02 | D11 = 3.14 | N6 = 1.67270 | ν6 = 32.1 |
| R12 = −15.50 | D12 = 3.86 | | |
| R13 = −10.94 | D13 = 1.50 | N7 = 1.74320 | ν7 = 49.3 |
| R14 = −220.38 | | | |

| Variable | Focal Length | | |
|---|---|---|---|
| Separation | 28.95 | 45.56 | 68.00 |
| D10 | 13.76 | 6.88 | 2.93 |

R4: Aspheric Surface

B = 1.188 D-04    C = 6.421 D-07

R13: Aspheric Surface

B = 3.257 D-05    C = 2.639 D-07    D = −5.244 D-09
E = 8.606 D-11

Numerical Example 4:

| | | | |
|---|---|---|---|
| f = 28.95–68.00 | Fno = 1:5.7–8.0 | 2ω = 73.5°–35.3° | |
| R1 = 67.65 | D1 = 1.50 | N1 = 1.67270 | ν1 = 32.1 |
| R2 = 191.92 | D2 = 1.54 | | |
| R3 = −15.88 | D3 = 1.30 | N2 = 1.66910 | ν2 = 55.4 |
| R4 = 53.28 | D4 = 1.43 | | |
| R5 = 37.34 | D5 = 2.91 | N3 = 1.51633 | ν3 = 64.2 |
| R6 = −18.60 | D6 = 1.04 | | |
| R7 = 51.78 | D7 = 0.89 | N4 = 1.80518 | ν4 = 25.4 |
| R8 = 21.55 | D8 = 3.48 | N5 = 1.51633 | ν5 = 64.2 |
| R9 = −13.11 | D9 = 0.70 | | |
| R10 = (Stop) | D10 = Variable | | |
| R11 = −37.33 | D11 = 3.91 | N6 = 1.62004 | ν6 = 36.3 |
| R12 = −13.01 | D12 = 1.44 | | |
| R13 = −11.01 | D13 = 1.20 | N7 = 1.66910 | ν7 = 55.4 |
| R14 = −18.62 | D14 = 2.20 | | |
| R15 = −12.65 | D15 = 1.30 | N8 = 1.77250 | ν8 = 49.6 |
| R16 = −142.63 | | | |

| Variable | Focal Length | | |
|---|---|---|---|
| Separation | 28.95 | 45.26 | 68.10 |
| D10 | 11.76 | 5.88 | 2.37 |

R4: Aspheric Surface

B = 1.428 D-04    C = 1.062 D-06

R11: Aspheric Surface

B = 5.096 D-05    C = −4.700 D-08    D = 6.049 D-09
E = 1.209 D-11

Numerical Example 5:

| | | | |
|---|---|---|---|
| f = 28.96–68.00 | Fno = 1:5.6–8.6 | 2ω = 73.5°–35.3° | |
| R1 = 45.61 | D1 = 1.50 | N1 = 1.67270 | ν1 = 32.1 |
| R2 = 92.81 | D2 = 1.46 | | |
| R3 = −15.82 | D3 = 1.42 | N2 = 1.67790 | ν2 = 55.3 |
| R4 = 26.99 | D4 = 0.49 | | |
| R5 = 24.53 | D5 = 3.68 | N3 = 1.58313 | ν3 = 59.4 |
| R6 = −11.00 | D6 = 0.30 | | |
| R7 = −10.80 | D7 = 1.02 | N4 = 1.65844 | ν4 = 50.9 |
| R8 = −19.77 | D8 = 0.72 | | |
| R9 = 39.16 | D9 = 0.89 | N5 = 1.84666 | ν5 = 23.8 |
| R10 = 20.94 | D10 = 3.47 | N6 = 1.51633 | ν6 = 64.2 |
| R11 = −12.91 | D11 = 0.64 | | |
| R12 = (Stop) | D12 = Variable | | |
| R13 = −27.35 | D13 = 3.64 | N7 = 1.64769 | ν7 = 33.8 |
| R14 = −12.69 | D14 = 2.05 | | |
| R15 = −10.38 | D15 = 1.20 | N8 = 1.66910 | ν8 = 55.4 |
| R16 = −18.04 | D16 = 1.72 | | |
| R17 = −13.27 | D17 = 1.30 | N9 = 1.77250 | ν9 = 49.6 |
| R18 = −92.35 | | | |

-continued

| Variable | Focal Length | | | |
|---|---|---|---|---|
| Separation | 28.97 | 33.84 | 68.00 | 42.63 |
| D12 | 12.02 | 9.69 | 2.74 | 6.84 |

R5: Aspheric Surface

B = −1.373 D-04    C = −1.032 D-06

R15: Aspheric Surface

B = 4.257 D-05    C = 3.731 D-07    D = −3.608 D-09
E = 1.056 D-10

Numerical Example 6:

f = 29.01–77.73    Fno = 1:5.7–9.8    2ω = 73.4°–31.1°
R1 = 56.22      D1 = 1.50       N1 = 1.58144    ν1 = 40.8
R2 = −240.32    D2 = 1.49
R3 = −16.80     D3 = 1.53       N2 = 1.74320    ν2 = 49.3
R4 = 34.40      D4 = 2.12
R5 = 109.54     D5 = 2.89       N3 = 1.48749    ν3 = 70.2
R6 = −16.87     D6 = 0.60
R7 = 35.91      D7 = 0.90       N4 = 1.84666    ν4 = 23.8
R8 = 24.86      D8 = 3.46       N5 = 1.48749    ν5 = 70.2
R9 = −12.30     D9 = 0.70
R10 = (Stop)    D10 = Variable
R11 = −49.74    D11 = 3.71      N6 = 1.60342    ν6 = 38.0
R12 = −14.47    D12 = 1.94
R13 = −13.11    D13 = 1.20      N7 = 1.77250    ν7 = 49.6
R14 = −44.17    D14 = 2.59
R15 = −16.41    D15 = 1.30      N8 = 1.77250    ν8 = 49.6
R16 = −76.97

| Variable | Focal Length | | |
|---|---|---|---|
| Separation | 29.01 | 56.78 | 77.73 |
| D10 | 12.38 | 4.50 | 2.29 |

R4: Aspheric Surface

B = 1.446 D-04    C = 1.431 D-06

TABLE 1

| | Numerical Example | | |
|---|---|---|---|
| Condition | 1 | 2 | 3 |
| (1) DLT/fT | 0.40 | 0.40 | 0.40 |
| (2) LY/fW | 0.75 | 0.75 | 0.75 |
| (3) DL1/fT | 0.20 | 0.20 | 0.22 |
| (4) RaF/fT | −0.23 | −0.25 | −0.25 |
| (5) NaL | 1.669 | 1.669 | 1.669 |
| (6) νaL | 55.4 | 55.4 | 55.4 |
| Condition | 4 | 5 | 6 |
| (1) DLT/fT | 0.40 | 0.41 | 0.36 |
| (2) LY/fW | 0.75 | 0.75 | 0.75 |
| (3) DL1/fT | 0.21 | 0.22 | 0.19 |
| (4) RaF/fT | −0.23 | −0.23 | −0.22 |
| (5) NaL | 1.669 | 1.678 | 1.743 |
| (6) νaL | 55.4 | 55.3 | 49.3 |

According to the invention, as applied to the type of zoom lens in which two lens units of predetermined refractive powers are moved to effect zooming, the rules of lens design are set forth for the lens units as described before. With this, it is possible to achieve a zoom lens of simple form whose total length is shortened with a zoom ratio of 2.4 to 2.7, while still permitting a high optical performance to be maintained stable throughout the entire zooming range.

What is claimed is:

1. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, wherein said first lens unit has a diaphragm at a position most close to an image plane side, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88.$$

2. A zoom lens according to claim 1, satisfying the following condition:

$$0.09 < DL1/fT < 0.27$$

where DL1 is the distance from the first lens surface of said first lens unit to the last lens surface thereof.

3. A zoom lens according to claim 1, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

4. A zoom lens according to claim 1, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

5. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, and the frontmost one of the negative lenses in said first lens unit has an aspheric surface of such shape that a negative refractive power gets progressively stronger as going from the lens center to the margin, and wherein, letting a refractive index of the material of the frontmost one of the negative lenses be denoted by NaL, the following condition is satisfied:

$$1.65 < NaL,$$

and
   wherein the aspheric surface of the frontmost one of the negative lenses in said first lens unit is a lens surface on an image side, and a lens surface on an object side of the frontmost negative lens has a radius of curvature RaF made to satisfy the following condition:

$$-0.37 < RaF/fT < -0.11$$

where fT is the longest focal length of the entire system.

6. A zoom lens according to claim 5, satisfying the following condition:

$$49 < νaL$$

where vaL is the Abbe number of the material of the frontmost one of the negative lenses in said first lens unit.

7. A zoom lens according to claim 5, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

8. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein said first lens unit includes at least four lens elements, and adjacent lens elements thereof have a different curvature on their opposing surfaces.

9. A zoom lens according to claim 8, satisfying the following condition:

$$0.09 < DL1/fT < 0.27$$

where DL1 is the distance from the first lens surface of said first lens unit to the last lens surface thereof.

10. A zoom lens according to claim 8, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

11. A zoom lens according to claim 8, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

12. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein said first lens unit includes at least four lens elements separated by air spacing.

13. A zoom lens according to claim 12, satisfying the following condition:

$$0.09 < DL1/fT < 0.27$$

where DL1 is the distance from the first lens surface of said first lens unit to the last lens surface thereof.

14. A zoom lens according to claim 12, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

15. A zoom lens according to claim 12, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

16. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, wherein said first lens unit has a diaphragm at a position most close to an image plane side, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein said first lens unit has at least one cemented lens.

17. A zoom lens according to claim 16, satisfying the following condition:

$$0.09 < DL1/fT < 0.27$$

wherein DL1 is the distance from the first lens surface of said first lens unit to the last lens surface thereof.

18. A zoom lens according to claim 16, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

19. A zoom lens according to claim 16, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

20. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, wherein said first lens unit has a diaphragm at a position most close to an image plane side, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein the lens of said first lens unit closest to the object side of said first lens unit is a positive lens.

21. A zoom lens according to claim 20, satisfying the following condition:

$$0.09 < DL1/fT < 0.27$$

wherein DL1 is the distance from the first lens surface of said first lens unit to the last lens surface thereof.

22. A zoom lens according to claim 20, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

23. A zoom lens according to claim 20, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

24. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein said first lens unit includes at least four lens elements, and adjacent lens elements thereof have a different curvature on their opposing surfaces, and wherein the lens of said first lens unit closest to the object side of said first lens unit is a positive lens.

25. A zoom lens according to claim 24, satisfying the following condition:

$$0.09 < DL1/fT < 0.27$$

wherein DL1 is the distance from the first lens surface of said first lens unit to the last lens surface thereof.

26. A zoom lens according to claim 24, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$$-0.37 < RaF/fT < -0.11.$$

27. A zoom lens according to claim 24, wherein said first lens unit has, in order from the object side, a positive lens of meniscus form convex toward the object side, a negative lens of bi-concave form, a positive lens of bi-convex form having a strong positive refracting surface facing an image side as compared with the object side, at least one negative lens, and a positive lens of bi-convex form having a strong refracting surface facing the image side as compared with the object side.

28. A zoom lens comprising, from front to rear, a first lens unit of positive refractive power and a second lens unit of negative refractive power, zooming being performed by varying a separation between said first lens unit and said second lens unit, wherein said first lens unit has at least two positive lenses and at least two negative lenses, and wherein, letting the distance from the first lens surface to the last lens surface in a telephoto end be denoted by DLT, the diagonal length of the effective area of an image frame by LY and the shortest and longest focal lengths of the entire system by fW and fT, respectively, the following conditions are satisfied:

$$0.22 < DLT/fT < 0.43$$

$$1.31 < LY/fW < 1.88,$$

wherein said first lens unit includes at least four lens elements separated by air spacing, and wherein the lens of-said first lens unit closest to the object side of said first lens unit is a positive lens.

29. A zoom lens according to claim 28, satisfying the following condition:

$$0.09 < DL1/fT < 0.27$$

wherein DL1 is the distance from the first lens surface of said first lens unit to the last lens surface thereof.

30. A zoom lens according to claim 28, wherein the frontmost one of the negative lenses in said first lens unit has a lens surface on an image side formed to an aspheric shape such that a negative refractive power gets progressively stronger as going from the lens center to the margin and a lens surface on an object side formed to a radius of curvature RaF satisfying the following condition:

$-0.37 < RaF/fT < -0.11$.

31. A zoom lens according to claim 29, wherein said first lens unit has, in order from the object side, a positive lens of meniscus form convex toward the object side, a negative lens of biiconcave form, a positive lens of bi-convex form having a strong positive refracting surface facing an image side as compared with the object side, at least one negative lens, and a positive lens of bi-convex form having a strong refracting surface facing the image side as compared with the object side.

* * * * *

UNITED STATES PATENT AND TRADEMARK OFFICE
CERTIFICATE OF CORRECTION

PATENT NO. : 5,844,725

DATED : December 1, 1998

INVENTOR(S) : Yoshinori ITOH

Page 1 of 2

It is certified that error appears in the above-identified patent and that said Letters Patent is hereby corrected as shown below:

ON THE COVER PAGE:

At [56] References Cited - U.S. Patent Documents:

"5,463,449" should read --5,463,499--.

COLUMN 3:

Line 27, "16B, 16C and 16D" should read --17B, 17C and 17D--.

COLUMN 14:

Line 52, "of-said" should read --of said--.

UNITED STATES PATENT AND TRADEMARK OFFICE
CERTIFICATE OF CORRECTION

PATENT NO. : 5,844,725

DATED : December 1, 1998

INVENTOR(S) : Yoshinori ITOH

It is certified that error appears in the above-identified patent and that said Letters Patent is hereby corrected as shown below:

COLUMN 15:

Line 3, "claim 29," should read --claim 28,--.
   Line 6, "biiconcave" should read --bi-concave--.

Signed and Sealed this

Twenty-seventh Day of July, 1999

Attest:

Q. TODD DICKINSON

*Attesting Officer*     *Acting Commissioner of Patents and Trademarks*